United States Patent
Yu et al.

(10) Patent No.: US 12,025,761 B2
(45) Date of Patent: Jul. 2, 2024

(54) EARLY IDENTIFICATION METHOD FOR SHALLOW SOIL LANDSLIDE

(71) Applicants: Chengdu University of Technology, Chengdu (CN); Guizhou Geological Environment Monitoring Institute (Guizhou Institute of Environmental Geology), Guiyang (CN)

(72) Inventors: Bin Yu, Chengdu (CN); Yangchun Li, Guiyang (CN); Weiwei Deng, Guiyang (CN); Lingwei Yang, Chengdu (CN); Wenhong Chen, Chengdu (CN)

( * ) Notice: Subject to any disclaimer, the term of this patent is extended or adjusted under 35 U.S.C. 154(b) by 0 days.

(21) Appl. No.: 18/058,794

(22) Filed: Nov. 25, 2022

(65) Prior Publication Data

US 2023/0168399 A1    Jun. 1, 2023

(30) Foreign Application Priority Data

Nov. 26, 2021   (CN) .......................... 202111422778.8

(51) Int. Cl.
*G01V 1/01*      (2024.01)
*G06F 16/29*     (2019.01)

(52) U.S. Cl.
CPC ................ *G01V 1/01* (2024.01); *G06F 16/29* (2019.01)

(58) Field of Classification Search
CPC ...... G01V 1/008; G01V 99/005; G06F 16/29; G06T 17/05; G06T 17/30; Y02A 10/23
See application file for complete search history.

(56) References Cited

U.S. PATENT DOCUMENTS

2021/0026027 A1*   1/2021   Zhang ...................... G01V 1/36
2022/0012460 A1*   1/2022   Yu .......................... G06F 18/217

OTHER PUBLICATIONS

Milledge, D. G., D. Bellugi, J. A. McKean, A. L. Densmore, and W. E. Dietrich (2014), A multidimensional stability model for predicting shallow landslide size and shape across landscapes, J. Geophys. Res. Earth Surf., 119, 2481-2504, doi: 10.1002/2014JF003135. (Year: 2014).*
Yu, X., Zhang, K., Song, Y. et al. Study on landslide susceptibility mapping based on rock-soil characteristic factors. Sci Rep 11, 15476 (2021). https://doi.org/10.1038/s41598-021-94936-5 (Year: 2021).*
Office Action of CN202111422778.8, Mailed Jun. 14, 2022.
Notice of Grant of CN202111422778.8, Mailed Sep. 21, 2022.

* cited by examiner

*Primary Examiner* — Yoshihisa Ishizuka
(74) *Attorney, Agent, or Firm* — Zhigang Ma

(57) ABSTRACT

This is an early identification method for a shallow soil landslide, belonging to the technical field of landslide prevention and control engineering. The present invention accurately determines and identifies a shallow soil landslide in a quantitative manner, improving the early identification efficiency of a landslide and helping to improve the disaster prevention effect.

2 Claims, 2 Drawing Sheets

EARLY IDENTIFICATION METHOD FOR SHALLOW SOIL LANDSLIDE

This application claims the benefit and priority of Chinese Patent Application Number 202111422778.8, filed on Nov. 26, 2021 with China National Intellectual Property Administration, the disclosures of which are incorporated herein by reference in their entireties.

BACKGROUND OF THE PRESENT INVENTION

Field of the Invention

The present invention relates to the technical field of landslide prevention and control engineering, in particular to an early identification method for a shallow soil landslide.

Description of Related Arts

The occurrence of shallow soil landslides often requires three conditions: first, topographic conditions conducive to the occurrence of shallow soil landslides; second, sufficient soil sources, i.e., loose soil covering layers; and third, abundant rainfall enters the soil. These conditions comprehensively affect and determine the stability of slope soil. Among them, the influence factors of topographic conditions on shallow soil landslides include: slope gradient of a potential landslide mass, cross-sectional depression of the landslide mass, gentle slope topography on the upper side of the landslide mass and free face topography on the lower side. In the prior art, the studies on the topographic conditions of shallow soil landslides mainly focus on slope gradient, cross-sectional depressed and vertical-sectional bulged topographies are sometimes used for quantitative description, but mainly a field measurement method is used, which is not conducive to the early warning of large-scale shallow soil landslides. If the susceptibilities of landslides are determined by means of digital topographic maps through slopes, plane curvatures and profile curvatures, because the scales of landslide masses are not accurately determined, the results of calculating different scales of landslides with a unified DEM scale have great errors in the slopes, plane curvatures and profile curvatures of the landslides.

Chinese patent No. CN112071028A published on Dec. 11, 2020 discloses a monitoring and early warning method for a shallow landslide, including: for a plurality of monitoring indexes, collecting monitoring data corresponding to each monitoring index, wherein the plurality of monitoring indexes include rainfall, landslide surface displacement, soil volume water content and pipeline strain of oil and gas pipelines, and the oil and gas pipelines are laid in the shallow landslide; for a plurality of early warning classification indexes, determining early warning classification data corresponding to each early warning classification index based on the monitoring data, wherein the plurality of early warning classification indexes include an index for characterizing the deformation of the shallow landslide and an index for characterizing the failure of the oil and gas pipelines; acquiring a preset early warning classification model, wherein the early warning classification model is used for performing early warning level classification on the landslide risk of the shallow landslide according to the early warning classification data; and determining an early warning level of the shallow landslide based on the early warning classification model and the early warning classification data corresponding to each early warning classification index.

The monitoring and early warning method for a shallow landslide disclosed in this patent document need to monitor rainfall, landslide surface displacement, soil volume water content and pipeline strain of oil and gas pipelines, which makes the early warning work complicated, leads to low early identification efficiency of landslides and affects disaster prevention effects.

SUMMARY OF THE PRESENT INVENTION

In order to overcome the above defects of the prior art, the present invention provides an early identification method for a shallow soil landslide, which accurately determines and identifies a shallow soil landslide in a quantitative manner, thereby improving the early identification efficiency of a landslide and helping to improve the disaster prevention effect.

The present invention is implemented by the following technical solution:

An early identification method for a shallow soil landslide is characterized by comprising the following steps:

S1, obtaining topographic digital elevation model (DEM) data of a terrain area to be identified, generating a topographic map based on the DEM data, and determining a slope area with a depressed cross section based on contour lines in the topographic map, wherein the slope area with a depressed cross section refers to an area where the contour lines bulge upward when viewed from the bottom to the top of the topographic map; then determining outer boundaries of two sides of a potential landslide mass from the beginning of straight segments or downward bulged vertices on both sides of an upward bulged vertex of each contour line in the slope area; drawing a straight line to connect the beginning of straight segments or downward bulged vertices on both sides of the upward bulged vertex of a contour line located at the bottom of the slope area, and determining the straight line as a bottom boundary of the potential landslide mass; drawing an intermediate line at an intermediate position of the potential landslide mass and perpendicular to the bottom boundary of the potential landslide mass, wherein the upward bulged vertex of each contour line in the potential landslide mass is located near the intermediate line; and determining a plurality of intermediate points on the intermediate line, with one DEM point spacing between each of two adjacent intermediate points, and one of the intermediate point being located at an intersection of the bottom boundary and the intermediate line; drawing a plurality of parallel lines respectively, wherein each parallel line is perpendicular to the intermediate line and across the intermediate point to intersect the outer boundaries of the potential landslide mass, wherein the intersection points of each parallel line and the outer boundaries of the potential landslide mass 20 are determined as outer boundary points, which together with the intermediate point on the same parallel line constitute a three-point group of a plane curvature Qp of the intermediate point of the potential landslide mass;

S2, calculating a slope of each intermediate point according to the position and grid data of the intermediate point in the topographic map, and finally, taking an arithmetic average of the slopes of all the intermediate points as a slope α of the potential landslide mass; assigning, according to the distribution principle of topographic DEM data, all points in each grid of the topographic map with the same values, comprising coordinates and elevation, which are obtained through the grid;

S3, calculating the plane curvature Qp of each intermediate point of the potential landslide mass through a three-point method according to Formula 1 to Formula 7, and then taking an arithmetic average of the plane curvatures Qp of all of the intermediate points to obtain a plane curvature Q of the potential landslide mass;

$$Qp = 2\sin A/a \quad \text{Formula 1}$$

$$A = \arccos\left[(b^2 + c^2 - a^2)/(2bc)\right] \quad \text{Formula 2}$$

$$a = \sqrt{(x_1 - x_2)^2 + (y_1 - y_2)^2} \quad \text{Formula 3}$$

$$b = \sqrt{(x_1 - x_3)^2 + (y_1 - y_3)^2} \quad \text{Formula 4}$$

$$c = \sqrt{(x_3 - x_2)^2 + (y_3 - y_2)^2} \quad \text{Formula 5}$$

Where Qp is a plane curvature of an intermediate point of the potential landslide mass, $x_1$, $x_2$ and $x_3$ are projected X coordinates of the first group of points 1, 2 and 3 in turn, $x_1=0$, and $x_2$ is a linear distance between points 1 and 2 and is calculated by Formula 6; $x_3$ is a linear distance between points 1 and 3 and is calculated by Formula 7; $y_1$, $y_2$ and $y_3$ are elevations of points 1, 2 and 3 respectively;

$$x_2 = \sqrt{(Xa - Xb)^2 + (Ya - Yb)^2} \quad \text{Formula 6}$$

$$x_3 = \sqrt{(Xa - Xc)^2 + (Ya - Yc)^2} \quad \text{Formula 7}$$

Where Xa and Ya are X and Y coordinates of point 1 in turn; Xb and Yb are X and Y coordinates of point 2 in turn; Xc and Yc are X and Y coordinates of point 3 in turn;

The plane curvatures Qp of the intermediate points of the second group of points to the fifth group of points of the potential landslide mass are each calculated by the Formula 1 to the Formula 7;

S4, calculating a topographic factor T of the potential landslide mass according to Formula 8;

$$T = \tan\alpha - 5Q \quad \text{Formula 8}$$

Where T is the topographic factor of the potential landslide mass, $\alpha$ is the slope of the potential landslide mass, and Q is the plane curvature of the potential landslide mass;

S5, performing early identification of the shallow soil landslide according to the slope $\alpha$ of the potential landslide mass, the plane curvature Q of the potential landslide mass and the topographic factor T:

When the slope $\alpha$ of the potential landslide mass is less than 15° or more than 50°, the possibility of landslide occurrence on the potential landslide mass is identified as low;

When the plane curvature Q of the potential landslide mass is more than 0, the possibility of landslide occurrence on the potential landslide mass is identified as low;

When the topographic factor T is less than 0.75, the possibility of landslide occurrence on the potential landslide mass is identified as low;

When the slope $\alpha$ of the landslide mass is more than or equal to 15° and less than or equal to 50°, the plane curvature Q of the potential landslide mass is less than or equal to 0 and the topographic factor T is more than or equal to 0.75, the possibility of landslide occurrence on the potential landslide mass is identified as medium;

When the slope $\alpha$ of the landslide mass is more than or equal to 15° and less than or equal to 50°, the plane curvature Q of the potential landslide mass is less than or equal to 0 and the topographic factor T is more than or equal to 1.0, the possibility of landslide occurrence on the potential landslide mass is identified as high.

In step S3, taking an arithmetic average refers to calculating a positive or negative sign of the plane curvature Qp of the intermediate point of the potential landslide mass according to Formula 9 and Formula 10;

$$\text{If } y_2 - kx_2 - y_1 > 0 \quad \text{Formula 9}$$

The plane curvature Qp of the intermediate point of the potential landslide mass is positive, indicating a bulged topography;

$$\text{If } y_2 - kx_2 - y_1 < 0 \quad \text{Formula 10}$$

The plane curvature Qp of the intermediate point of the potential landslide mass is negative, indicating a depressed topography;

Where k is a coefficient, calculated by Formula 11;

$$k = (y_3 - y_1)/x_3 \quad \text{Formula 11}$$

Then bringing the calculated positive or negative sign of the plane curvature Qp of the intermediate point of the potential landslide mass into the plane curvature Qp of the intermediate point of the potential landslide mass, and finally, performing arithmetic averaging on the plane curvatures Qp of the intermediate points of all groups of the potential landslide mass.

The arcgis described in the present invention refers to geographic information system software.

The DEM described in the present invention is index value elevation data.

The basic principle of the present invention is as follows:

Slope is the most important factor affecting the occurrence of a landslide. The magnitude of the slope not only affects the accumulation and distribution of loose clastic matters, but also affects the confluence condition of a slope surface. If the slope is too gentle, the landslide is underpowered and cannot occur. If the slope is too steep, the soil layer cannot gather enough thickness on the slope surface, and no landslide occurs. The cross-sectional depressed topography is favorable for rainwater to flow into the landslide mass and infiltrate into the shallow landslide mass, which leads to gradual saturation and softening of soil, gradual decrease of matrix suction and shear strength, further decrease of soil strength, and finally, slide along a sliding zone because the shear strength of a shear plane is lower than the shear stress. Therefore, the slope of a landslide mass and the cross-sectional depressed topography play their roles in a landslide, and especially the cross-sectional depressed topography determines the catchment condition. By comprehensively considering the topographic influence factors of a shallow soil landslide, the possibility of a landslide is determined quantitatively, so that a potential landslide mass can be early identified.

The beneficial effects of the present invention are mainly shown in the following aspects:

1. Comparing the present invention with the prior art, the topographic factor T can be used to identify the possibility of landslide occurrence on a potential landslide mass only when a slope condition and a cross-sectional non-bulged condition are present, and the greater the T value, the higher the possibility of future landslide occurrence on the potential landslide mass; otherwise, the smaller the T value, the lower the possibility of future landslide occurrence on the potential landslide mass. Accurately determining and identifying a shallow soil landslide in a quantitative manner improves the early identification efficiency of the landslide, and the early identification of the landslide is intuitive and clear, which is conducive to improving the effect of disaster prevention.

2. In the present invention, a three-point method is used to calculate the plane curvature of the potential landslide mass, so that the calculated plane curvature is more in line with the actual plane curvature of the potential landslide mass, and the calculation result is more accurate and reasonable, thus making the identification of the possibility of landslide occurrence on the potential landslide mass more accurate.

3. In the present invention, the range (boundaries) of the potential landslide mass is determined by means of DEM topographic data and the contour lines in the topographic map, and important DEM points and each group of data points (two outer boundary points 1 and 3 together with one intermediate point 2 on the same parallel line constitute a group of data points) are determined within this range. According to each group of data points, the slope a of the potential landslide mass and the plane curvature Qp of each intermediate point of the potential landslide mass are calculated; then the topographic factor T of the potential landslide mass is calculated; finally, the shallow soil landslide is identified according to the slope α of the potential landslide mass, the plane curvature Qp of each intermediate point of the potential landslide mass, and the topographic factor T; internal mechanism research is conducted on the possibility of landslide occurrence on the potential landslide mass based on topographic factors, which completely integrates the slope and cross-sectional topographic conditions of the potential landslide mass, comprehensively considers the role of topographic factors, and reflects the mutual relation and importance of various influence factors; where T, tan(a) and Q are all dimensionless parameters and can be used under various shallow soil landslide conditions, which greatly improves the applicability of disaster prevention.

4. In the present invention, the plane curvature of the potential landslide mass is calculated by the three-point method, which avoids errors caused by DEM data intervals and landslide scale differences. The conventional default method calculates the plane curvature of a potential landslide mass by means of a specific DEM point, as well as 8 points in upper (1), lower (1), left (1), right (1) and oblique directions (4), totaling 9 points, and the calculated plane curvature is related to the grid scale and range where the 9 points are located. However, if the scale of the potential landslide mass is quite different from the grid scale of this DEM, the plane curvature cannot reflect the plane curvature of the potential landslide mass; if the scale of the potential landslide mass is much larger than the grid scale of the DEM, the calculated plane curvature is a part of the plane curvature of the potential landslide mass, and even if multiple plane curvatures on the potential landslide mass are averaged, it cannot represent the depressed or bulged characteristics of the whole potential landslide mass; if the scale of the potential landslide mass is much smaller than the grid scale of the DEM, the calculated plane curvature is a plane curvature in an area outside the outer boundary of the potential landslide mass, and cannot represent the depressed or bulged characteristics of the whole potential landslide mass. The present invention overcomes the conventional curvature calculation problems by organically combining the three-point method, and the calculated plane curvature can reflect the true depressed or bulged characteristics of the potential landslide mass, which is conducive to improving the early identification accuracy of the shallow soil landslide.

DETAILED DESCRIPTION OF THE PREFERRED EMBODIMENT

An early identification method for a shallow soil landslide comprises the following steps.

Figure 1:
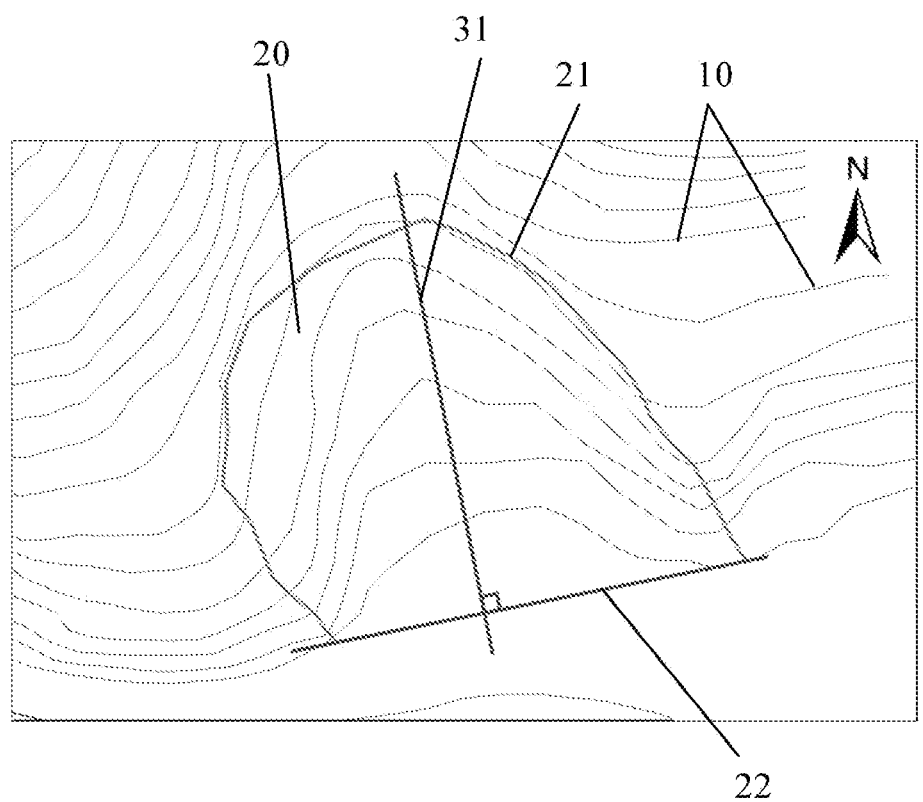
FIG. 1 is a schematic diagram of a topographic map generated based on topographic DEM data according to an embodiment of the present disclosure.
Figure 2:
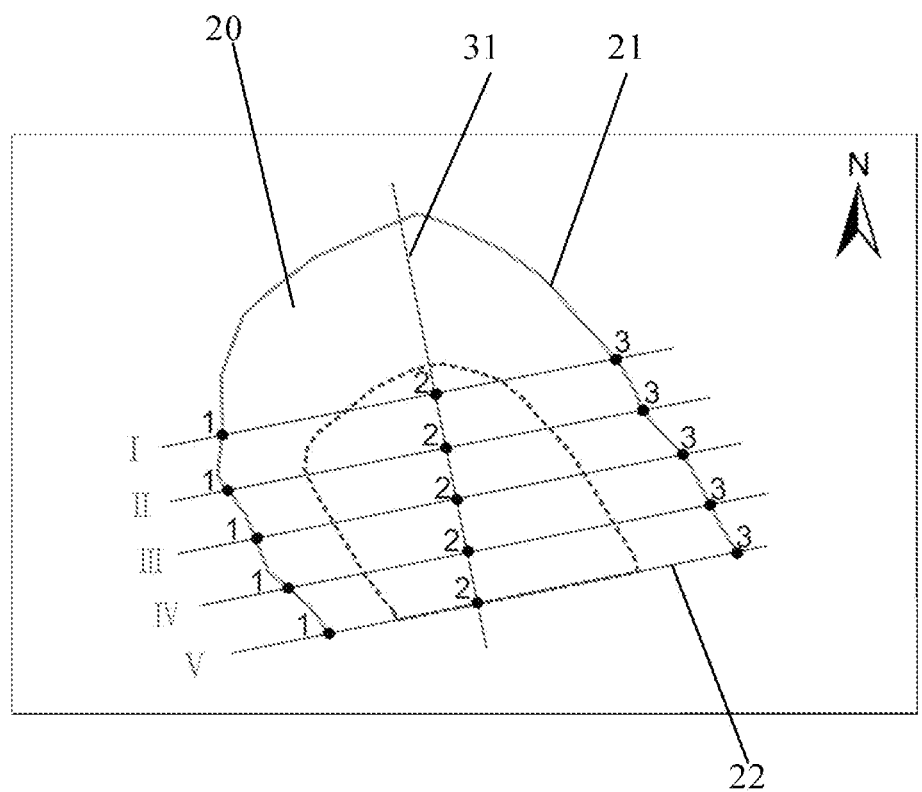
FIG. 2 is a schematic diagram of a point selection for planar curvature of a potential landslide mass based on the topographic map shown in FIG. 1 according to an embodiment of the present disclosure.

S1, topographic digital elevation model (DEM) data of a terrain area to be identified is obtained, a topographic map (as shown in FIG. 1) is generated based on the DEM data, and a slope area with a depressed cross section is determined based on contour lines 10 in the topographic map, where the slope area with a depressed cross section refers to an area where the contour lines 10 bulge upward when viewed from the bottom to the top of the topographic map; then outer boundaries 21 of two sides of a potential landslide mass 20 are determined from the beginning of straight segments or downward bulged vertices on both sides of an upward bulged vertex of each contour line 10 in the slope area; a straight line is drawn to connect the beginning of straight segments or downward bulged vertices on both sides of the upward bulged vertex of a contour line 10 located at the bottom of the slope area, and the straight line is determined as a bottom boundary 22 of the potential landslide mass 20; an intermediate line 31 is drawn at an intermediate position of the potential landslide mass 20 and perpendicular to the bottom boundary 22 of the potential landslide mass 20, where the upward bulged vertex of each contour line 10 in the potential landslide mass 20 is located near the intermediate line 21; as shown in FIG. 2, a plurality of intermediate points 2 are determined on the intermediate line 31, with one DEM point spacing between each of two adjacent intermediate points 2, and one of the intermediate point 2 being located at an intersection of the bottom boundary 22 and the intermediate line 31; a plurality of parallel lines I, II, III, IV, V are drawn respectively, where each parallel line is perpendicular to the intermediate line 31 and across the intermediate point 2 to intersect the outer boundaries of the potential landslide mass, where the intersection points of each parallel line and the outer boundaries of the potential landslide mass 20 are determined as outer boundary points 1 and 3; where the outer boundary points 1 and 3 together with the intermediate point 2 on the same parallel line constitute a three-point group of a plane curvature Qp of the intermediate point 2 of the potential landslide mass 20.

In this embodiment, the topographic DEM data represents the topography or terrain of a topographic area in a digital format. It provides detailed information about the elevation, slope, and shape of the Earth's surface. DEM data is typically derived from various sources such as satellite imagery, LiDAR (Light Detection and Ranging) technology, or ground survey measurements. It is widely used in fields like geography, geology, environmental science, and urban planning. DEM data is crucial for analyzing and visualizing terrain features, creating accurate topographic maps, conducting hydrological modeling, and simulating landscape changes. With its precise elevation information, DEM data plays a vital role in a wide range of applications, including land management, flood risk assessment, infrastructure planning, and 3D visualization.

As shown in FIG. 1, from the bottom to the top of the topographic map, the elevation of the contour lines 10 gradually increases. The sliding direction of the potential landslide mass 20 is along a direction from the top to the bottom of the intermediate line 31. The potential landslide mass 20 refers to a slope where landslides may occur.

S2, a slope of each intermediate point 2 is calculated according to the position and grid data of the intermediate point 2 in the topographic map, and finally, an arithmetic average of the slopes of all the intermediate points 2 is taken as a slope a of the potential landslide mass 20; according to the distribution principle of topographic DEM data, all points in each grid of the topographic map are assigned with the same values, including coordinates and elevation, which are obtained through the grid.

In the embodiment, the slope refers to a gradient in the sliding direction of potential landslide mass 20. A ratio of the height difference and horizontal displacement of two adjacent intermediate points 2 on the intermediate line 31, is the tangent of a slope of the hillside between these two intermediate points 2. The slope of each intermediate point can be calculated with specific software tools, such as ArcGis, which is a comprehensive geographic information system (GIS) software developed by Esri, a leading provider of GIS solutions. It is widely used in various industries for analyzing, managing, and visualizing geographic data.

S3, the plane curvature Qp of each intermediate point 2 of the potential landslide mass 20 is calculated through a three-point method according to Formula 1 to Formula 7, and then an arithmetic average of the plane curvatures Qp of all of the intermediate points 2 is taken to obtain a plane curvature Q of the potential landslide mass 20.

$$Qp = 2\sin A/a \qquad \text{Formula 1}$$

$$A = \arccos\left[(b^2 + c^2 - a^2)/(2bc)\right] \qquad \text{Formula 2}$$

$$a = \sqrt{(x_1 - x_2)^2 + (y_1 - y_2)^2} \qquad \text{Formula 3}$$

$$b = \sqrt{(x_1 - x_3)^2 + (y_1 - y_3)^2} \qquad \text{Formula 4}$$

$$c = \sqrt{(x_3 - x_2)^2 + (y_3 - y_2)^2} \qquad \text{Formula 5}$$

Where Qp is a plane curvature of an intermediate point 2 of the potential landslide mass 20, $x_1$, $x_2$ and $x_3$ are projected X coordinates of the first group of points 1, 2 and 3 in turn, $x_1=0$, and $x_2$ is a linear distance between points 1 and 2 and is calculated by Formula 6; $x_3$ is a linear distance between points 1 and 3 and is calculated by Formula 7; $y_1$, $y_2$ and $y_3$ are elevations of points 1, 2 and 3 respectively.

$$x_2 = \sqrt{(Xa - Xb)^2 + (Ya - Yb)^2} \qquad \text{Formula 6}$$

$$x_3 = \sqrt{(Xa - Xc)^2 + (Ya - Yc)^2} \qquad \text{Formula 7}$$

Where Xa and Ya are X and Y coordinates of point 1 in turn; Xb and Yb are X and Y coordinates of point 2 in turn; Xc and Yc are X and Y coordinates of point 3 in turn.

The plane curvatures Qp of the intermediate points 2 of the second group of points to the fifth group of points of the potential landslide mass are each calculated by Formula 1 to Formula 7.

S4, a topographic factor T of the potential landslide mass is calculated according to Formula 8.

$$T = \tan \alpha - 5Q \qquad \text{Formula 8}$$

Where T is the topographic factor of the potential landslide mass, $\alpha$ is the slope of the potential landslide mass, and Q is the plane curvature of the potential landslide mass.

S5, early identification of the shallow soil landslide is performed according to the slope $\alpha$ of the potential landslide mass, the plane curvature Q of the potential landslide mass and the topographic factor T:

When the slope a of the potential landslide mass is less than 15° or more than 50°, the possibility of landslide occurrence on the potential landslide mass is identified as low;

When the plane curvature Q of the potential landslide mass is more than 0, the possibility of landslide occurrence on the potential landslide mass is identified as low;

When the topographic factor T is less than 0.75, the possibility of landslide occurrence on the potential landslide mass is identified as low;

When the slope $\alpha$ of the potential landslide mass is more than or equal to 15° and less than or equal to 50°, the plane curvature Q of the potential landslide mass is less than or equal to 0, and the topographic factor T is more than or equal to 0.75 and less than 1.0, the possibility of landslide occurrence on the potential landslide mass is identified as medium;

When the slope $\alpha$ of the potential landslide mass is more than or equal to 15° and less than or equal to 50°, the plane curvature Q of the potential landslide mass is less than or equal to 0, and the topographic factor T is more than or equal to 1.0, the possibility of landslide occurrence on the potential landslide mass is identified as high.

The topographic factor T can be used to identify the possibility of landslide occurrence on a potential landslide mass only when a slope condition and a cross-sectional non-bulged condition are present, and the greater the T value, the higher the possibility of future landslide occurrence on the potential landslide mass; otherwise, the smaller the T value, the lower the possibility of future landslide occurrence on the potential landslide mass. Accurately determining and identifying a shallow soil landslide in a quantitative manner improves the early identification efficiency of the landslide, and the early identification of the landslide is intuitive and clear, which is conducive to improving the effect of disaster prevention.

In this embodiment, a three-point method is used to calculate the plane curvature of the potential landslide mass, so that the calculated plane curvature is more in line with the actual plane curvature of the potential landslide mass, and the calculation result is more accurate and reasonable, thus making the identification of the possibility of landslide occurrence on the potential landslide mass more accurate.

In addition, the range (boundaries) of the potential landslide mass is determined by means of DEM topographic data and the contour lines in the topographic map, and important DEM points and each group of data points (two outer boundary points 1 and 3 together with one intermediate point 2 on the same parallel line constitute a group of data points) are determined within this range. According to each group of data points, the slope a of the potential landslide mass and the plane curvature Qp of each intermediate point of the potential landslide mass are calculated; then the topographic factor T of the potential landslide mass is calculated; finally, the shallow soil landslide is identified according to the slope α of the potential landslide mass, the plane curvature Qp of each intermediate point of the potential landslide mass, and the topographic factor T; internal mechanism research is conducted on the possibility of landslide occurrence on the potential landslide mass based on topographic factors, which completely integrates the slope and cross-sectional topographic conditions of the potential landslide mass, comprehensively considers the role of topographic factors, and reflects the mutual relation and importance of various influence factors; where T, tan(a) and Q are all dimensionless parameters and can be used under various shallow soil landslide conditions, which greatly improves the applicability of disaster prevention.

In an embodiment, in step S3, taking an arithmetic average refers to that a positive or negative sign of the plane curvature Qp of the intermediate point of the potential landslide mass is calculated according to Formula 9 and Formula 10;

$$\text{If } y_2 - kx_2 - y_1 > 0 \quad \text{Formula 9}$$

The plane curvature Qp of the intermediate point of the potential landslide mass is positive, indicating a bulged topography;

$$\text{If } y_2 - kx_2 - y_1 < 0 \quad \text{Formula 10}$$

The plane curvature Qp of the intermediate point of the potential landslide mass is negative, indicating a depressed topography;

Where k is a coefficient, calculated by Formula 11;

$$k = (y_3 - y_1)/x_3 \quad \text{Formula 11}$$

Then the calculated positive or negative sign of the plane curvature Qp of the intermediate point of the potential landslide mass is brought into the plane curvature Qp of the intermediate point of the potential landslide mass, and finally, arithmetic averaging is performed on the plane curvatures Qp of the intermediate points of all groups of the potential landslide mass.

The plane curvature of a potential landslide mass is calculated by a three-point method, which avoids errors caused by DEM data intervals and landslide scale differences. The conventional default method calculates the plane curvature of a potential landslide mass by means of a specific DEM point, as well as 8 points in upper (1), lower (1), left (1), right (1) and oblique direction (4), totaling 9 points, and the calculated plane curvature is related to the grid scale and range where the 9 points are located. However, if the scale of the potential landslide mass is quite different from the grid scale of this DEM, the plane curvature cannot reflect the plane curvature of the potential landslide mass; if the scale of the potential landslide mass is much larger than the grid scale of the DEM, the calculated plane curvature is a part of the plane curvature of the potential landslide mass, and even if multiple plane curvatures on the potential landslide mass are averaged, it cannot represent the depressed or bulged characteristics of the whole potential landslide mass; if the scale of the potential landslide mass is much smaller than the grid scale of the DEM, the calculated plane curvature is a plane curvature in an area outside the outer boundary of the potential landslide mass, and cannot represent the depressed or bulged characteristics of the whole potential landslide mass. The present invention overcomes the conventional curvature calculation problems by organically combining the three-point method, and the calculated plane curvature can reflect the true depressed or bulged characteristics of the potential landslide mass, which is conducive to improving the early identification accuracy of the shallow soil landslide.

The present invention is described below with a specific example.

Sinan County and Yinjiang County are located in the northwest of Guizhou Province. In July 2014, the two counties suffered from rare continuous heavy rainfalls, which induced some shallow soil landslides. As shown in Table 1, landslides occurred at 11 of the 26 potential landslide masses in July 2014.

Table 1 shows the topographic parameters and early identification of 26 potential landslide masses investigated in Sinan County and Yinjiang County of Guizhou Province.

TABLE 1

| Serial number | α | tan (α) | Q | T | Possibility of landslide occurrence | Whether a landslide occurs |
|---|---|---|---|---|---|---|
| 1 | 31.5 | 0.613 | −0.0377 | 0.802 | Medium | Yes |
| 2 | 20.9 | 0.381 | −0.0398 | 0.580 | Low | No |
| 3 | 28.9 | 0.552 | −0.0325 | 0.715 | Low | No |
| 4 | 28.8 | 0.550 | −0.0405 | 0.753 | Medium | No |
| 5 | 40.0 | 0.838 | −0.00263 | 0.851 | Medium | Yes |
| 6 | 50.0 | 1.190 | −0.0002 | 1.191 | High | Yes |
| 7 | 31.1 | 0.603 | −0.0298 | 0.752 | Medium | No |
| 8 | 22.0 | 0.405 | −0.0208 | 0.509 | Low | No |
| 9 | 20.0 | 0.364 | −0.0227 | 0.478 | Low | No |
| 10 | 23.5 | 0.435 | −0.0287 | 0.579 | Low | No |
| 11 | 34.1 | 0.676 | −0.0183 | 0.767 | Medium | Yes |
| 12 | 48.3 | 1.124 | −0.0331 | 1.29 | High | Yes |
| 13 | 40.1 | 0.842 | −0.00015 | 0.843 | Medium | Yes |
| 14 | 43.2 | 0.939 | −0.0309 | 1.094 | High | Yes |
| 15 | 39.3 | 0.818 | −0.0310 | 0.973 | Medium | Yes |
| 16 | 42.3 | 0.910 | −0.0008 | 0.914 | Medium | Yes |
| 17 | 39.2 | 0.816 | 0.0011 | 0.811 | Low | No |
| 18 | 30.3 | 0.484 | −0.0368 | 0.768 | Medium | No |
| 19 | 19.6 | 0.356 | −0.0242 | 0.477 | Low | No |
| 20 | 41.5 | 0.885 | −0.0267 | 1.02 | High | Yes |
| 21 | 24.9 | 0.464 | −0.0341 | 0.635 | Low | No |
| 22 | 31.5 | 0.613 | −0.0302 | 0.764 | Medium | No |
| 23 | 27.4 | 0.518 | −0.0414 | 0.725 | Low | No |
| 24 | 45.6 | 1.02 | −0.0424 | 1.232 | High | Yes |
| 25 | 24.4 | 0.454 | −0.0424 | 0.666 | Low | No |
| 26 | 37.7 | 0.773 | −0.0375 | 0.961 | Medium | No |

Identification method: when the slope a of the potential landslide mass is less than 15° or more than 50°, the possibility of landslide occurrence on the potential landslide mass is identified as low;

When the plane curvature Q of the potential landslide mass is more than 0, the possibility of landslide occurrence on the potential landslide mass is low;

When the topographic factor T is less than 0.75, the possibility of landslide occurrence on the potential landslide mass is identified as low;

When the slope α of the potential landslide mass is more than or equal to 15° and less than or equal to 50°, the plane curvature Q of the potential landslide mass is less than or equal to 0, and the topographic factor T is more than or equal to 0.75 and less than 1.0, the possibility of landslide occurrence on the potential landslide mass is identified as medium;

When the slope a of the potential landslide mass is more than or equal to 15° and less than or equal to 50°, the plane curvature Q of the potential landslide mass is less than or equal to 0, and the topographic factor T is more than or equal to 1.0, the possibility of landslide occurrence on the potential landslide mass is identified as high.

From Table 1, the calculation results of the slope α of the potential landslide mass, the plane curvature Q of the potential landslide mass and the value of the topographic factor T show that, among the 26 potential landslide masses, 5 potential landslide masses were identified as having high possibilities of landslide occurrence, 11 potential landslide masses were identified as having medium possibilities of landslide occurrence, and 10 potential landslide masses were identified as having low possibilities of landslide occurrence.

With reference to actual situations, landslides occurred in July 2014 on all the 5 potential landslide masses identified as having high possibilities of landslide occurrence; landslides occurred in July 2014 6 of the 11 potential landslide masses identified as having medium possibilities of landslide occurrence, and landslides did not occur on the remaining 5 potential landslide masses; and no landslide occurred in July 2014 on all the 10 potential landslide masses identified as having low possibilities of landslide occurrence.

The above indicates that the method of the present invention has high accuracy in early identification of shallow soil landslides.

The invention claimed is:

1. An early identification method for a shallow soil landslide, characterized by comprising the following steps:
S1, obtaining topographic digital elevation model (DEM) data of a terrain area to be identified, generating a topographic map based on the DEM data, and determining a slope area with a depressed cross section based on contour lines in the topographic map, wherein the slope area with a depressed cross section refers to an area where the contour lines bulge upward when viewed from the bottom to the top of the topographic map; then determining outer boundaries of two sides of a potential landslide mass from the beginning of straight segments or downward bulged vertices on both sides of an upward bulged vertex of each contour line in the slope area; drawing a straight line to connect the beginning of straight segments or downward bulged vertices on both sides of the upward bulged vertex of a contour line located at the bottom of the slope area, and determining the straight line as a bottom boundary of the potential landslide mass; drawing an intermediate line at an intermediate position of the potential landslide mass and perpendicular to the bottom boundary of the potential landslide mass, wherein the upward bulged vertex of each contour line in the potential landslide mass is located near the intermediate line; and determining a plurality of intermediate points on the intermediate line, with one DEM point spacing between each of two adjacent intermediate points, and one of the intermediate point being located at an intersection of the bottom boundary and the intermediate line; drawing plurality of parallel lines respectively, wherein each parallel line is perpendicular to the intermediate line and across the intermediate point to intersect the outer boundaries of the potential landslide mass, wherein the intersection points of each parallel line and the outer boundaries of the potential landslide mass 20 are determined as outer boundary points, which together with the intermediate point on the same parallel line constitute a three-point group of a plane curvature Qp of the intermediate point of the potential landslide mass;
S2, calculating a slope of each intermediate point according to the position and grid data of the intermediate point in the topographic map, and finally, taking an arithmetic average of the slopes of all the intermediate points as a slope a of the potential landslide mass; assigning, according to the distribution principle of topographic DEM data, all points in each grid of the topographic map with the same values, comprising coordinates and elevation, which are obtained through the grid;
S3, calculating the plane curvature Qp of each intermediate point of the potential landslide mass through a three-point method according to Formula 1 to Formula 7, and then taking an arithmetic average of the plane curvatures Qp of all of the intermediate points to obtain a plane curvature Q of the potential landslide mass;

$$Qp = 2\sin A/a \qquad \text{Formula 1}$$

$$A = \arccos\left[(b^2 + c^2 - a^2)/(2bc)\right] \qquad \text{Formula 2}$$

$$a = \sqrt{(x_1-x_2)^2 + (y_1-y_2)^2} \qquad \text{Formula 3}$$

$$b = \sqrt{(x_1-x_3)^2 + (y_1-y_3)^2} \qquad \text{Formula 4}$$

$$c = \sqrt{(x_3-x_2)^2 + (y_3-y_2)^2} \qquad \text{Formula 5}$$

where Qp is a plane curvature of an intermediate point of the potential landslide mass, $x_1$, $x_2$ and $x_3$ are projected X coordinates of the first group of points 1, 2 and 3 in turn, $x_1=0$, and $x_2$ is a linear distance between points 1 and 2 and is calculated by Formula 6; $x_3$ is a linear distance between points 1 and 3 and is calculated by Formula 7; $y_1$, $y_2$ and $y_3$ are elevations of points 1, 2 and 3 respectively;

$$x_2 = \sqrt{(Xa-Xb)^2 + (Ya-Yb)^2} \qquad \text{Formula 6}$$

$$x_3 = \sqrt{(Xa-Xc)^2 + (Ya-Yc)^2} \qquad \text{Formula 7}$$

where Xa and Ya are X and Y coordinates of point 1 in turn; Xb and Yb are X and Y coordinates of point 2 in turn; Xc and Yc are X and Y coordinates of point 3 in turn;
wherein the plane curvatures Qp of the intermediate points of the second group of points to the fifth group of points of the potential landslide mass are each calculated by the Formula 1 to the Formula 7;
S4, calculating a topographic factor T of the potential landslide mass according to Formula 8;

$$T = \tan \alpha - 5Q \qquad \text{Formula 8}$$

where T is the topographic factor of the potential landslide mass, α is the slope of the potential landslide mass, and Q is the plane curvature of the potential landslide mass;
S5, performing early identification of the shallow soil landslide according to the slope α of the potential landslide mass, the plane curvature Q of the potential landslide mass and the topographic factor T:
when the slope α of the potential landslide mass is less than 15° or more than 50°, the possibility of landslide occurrence on the potential landslide mass is identified as low;
when the plane curvature Q of the potential landslide mass is more than 0, the possibility of landslide occurrence on the potential landslide mass is identified as low;

when the topographic factor T is less than 0.75, the possibility of landslide occurrence on the potential landslide mass is identified as low;

when the slope α of the landslide mass is more than or equal to 15° and less than or equal to 50°, the plane curvature Q of the potential landslide mass is less than or equal to 0 and the topographic factor T is more than or equal to 0.75, the possibility of landslide occurrence on the potential landslide mass is identified as medium; and when the slope α of the landslide mass is more than or equal to 15° and less than or equal to 50°, the plane curvature Q of the potential landslide mass is less than or equal to 0 and the topographic factor T is more than or equal to 1.0, the possibility of landslide occurrence on the potential landslide mass is identified as high.

2. The early identification method for a shallow soil landslide according to claim 1, characterized in that in step S3, taking an arithmetic average refers to calculating a positive or negative sign of the plane curvature Qp of the intermediate point of the potential landslide mass according to Formula 9 and Formula 10;

$$\text{if } y_2 - kx_2 y_1 > 0 \qquad \text{Formula 9}$$

the plane curvature Qp of the intermediate point of the potential landslide mass is positive, indicating a bulged topography;

$$\text{if } y_2 - kx_2 y_1 < 0 \qquad \text{Formula 10}$$

the plane curvature Qp of the intermediate point of the potential landslide mass is negative, indicating a depressed topography;

where k is a coefficient, calculated by Formula 11;

$$k = (y_3 y_1)/x_3 \qquad \text{Formula 11}$$

then bringing the calculated positive or negative sign of the plane curvature Qp of the intermediate point of the potential landslide mass into the plane curvature Qp of the intermediate point of the potential landslide mass, and finally, performing arithmetic averaging on the plane curvatures Qp of the intermediate points of all groups of the potential landslide mass.

\* \* \* \* \*